(12) United States Patent
Smith et al.

(10) Patent No.: US 10,241,842 B2
(45) Date of Patent: Mar. 26, 2019

(54) CLOUD CONTAINER RESOURCE BINDING AND TASKING USING KEYS

(71) Applicant: Intel Corporation, Santa Clara, CA (US)

(72) Inventors: Ned M. Smith, Beaverton, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 15/280,990

(22) Filed: Sep. 29, 2016

(65) Prior Publication Data
US 2018/0089001 A1 Mar. 29, 2018

(51) Int. Cl.
*G06F 9/46* (2006.01)
*G06F 9/50* (2006.01)
*G06F 21/62* (2013.01)

(52) U.S. Cl.
CPC .......... *G06F 9/5083* (2013.01); *G06F 9/5044* (2013.01); *G06F 9/5077* (2013.01); *G06F 21/6245* (2013.01); *G06F 9/466* (2013.01)

(58) Field of Classification Search
CPC ....................................................... G06F 9/52
USPC ....................................................... 718/104
See application file for complete search history.

(56) References Cited

U.S. PATENT DOCUMENTS

| | | | | |
|---|---|---|---|---|
| 6,470,339 B1* | 10/2002 | Karp | ....................... | G06F 9/468 707/704 |
| 7,107,591 B1* | 9/2006 | Karp | ....................... | G06F 9/465 718/100 |
| 7,356,559 B1* | 4/2008 | Jacobs | ....................... | G06F 8/34 707/999.01 |
| 9,755,987 B2* | 9/2017 | Wheeler | .................. | H04L 47/70 |
| 2003/0115243 A1* | 6/2003 | Smith | ................... | G06F 9/5044 718/104 |
| 2008/0040725 A1* | 2/2008 | Moss | ...................... | G06F 8/314 718/106 |
| 2009/0133021 A1* | 5/2009 | Coulter | ................ | G06F 9/5038 718/102 |
| 2009/0281865 A1* | 11/2009 | Stoitsev | ................ | G06Q 10/06 705/7.22 |
| 2010/0100886 A1* | 4/2010 | Takagi | .................. | G06F 9/5027 718/104 |
| 2010/0318995 A1* | 12/2010 | Messmer | .............. | G06F 9/4881 718/102 |

(Continued)

FOREIGN PATENT DOCUMENTS

| | | |
|---|---|---|
| KR | 101396394 B1 | 5/2014 |
| WO | WO-2018063663 A1 | 4/2018 |

OTHER PUBLICATIONS

"International Application Serial No. PCT/US2017/049074, International Search Report dated Dec. 14, 1017", 3 pgs.

(Continued)

*Primary Examiner* — Mehran Kamran
(74) *Attorney, Agent, or Firm* — Schwegman Lundberg & Woessner, P.A.

(57) ABSTRACT

Cloud container resource binding and tasking using keys is generally described herein. An example device to bind and perform tasks using cloud-based resource may include a container to claim tasks to be performed and to select and bind to a resource based on capabilities of the resource and requirements of the tasks.

20 Claims, 6 Drawing Sheets

(56) References Cited

U.S. PATENT DOCUMENTS

| | | | |
|---|---|---|---|
| 2011/0078652 A1* | 3/2011 | Mani | G06F 8/10 717/105 |
| 2012/0137002 A1 | 5/2012 | Ferris et al. | |
| 2012/0159507 A1* | 6/2012 | Kwon | G06F 8/451 718/104 |
| 2013/0139172 A1* | 5/2013 | An | G06F 9/5005 718/104 |
| 2013/0297690 A1* | 11/2013 | Lucero | G06Q 50/01 709/204 |
| 2013/0325543 A1* | 12/2013 | Magee | G06F 9/5016 705/7.25 |
| 2013/0326538 A1* | 12/2013 | Gupta | G06F 9/50 718/107 |
| 2015/0113540 A1* | 4/2015 | Rabinovici | G06F 9/5011 718/104 |
| 2015/0160936 A1 | 6/2015 | Morgan | |
| 2015/0178667 A1* | 6/2015 | Xu | G06Q 10/06311 705/7.15 |
| 2015/0222564 A1* | 8/2015 | Wheeler | H04L 47/70 709/226 |
| 2015/0301854 A1* | 10/2015 | Park | G06F 9/4881 718/102 |
| 2015/0331717 A1* | 11/2015 | Boenisch | G06F 9/48 718/107 |
| 2015/0365416 A1 | 12/2015 | Narayanan et al. | |
| 2016/0036886 A1* | 2/2016 | Ito | H04L 65/605 709/219 |
| 2016/0154794 A1 | 6/2016 | Knapp et al. | |
| 2016/0246276 A1* | 8/2016 | Rischar | G05B 19/0426 |
| 2016/0344610 A1* | 11/2016 | Robinette | H04L 43/50 |
| 2017/0163616 A1* | 6/2017 | Smith | H04L 63/061 |
| 2017/0178056 A1* | 6/2017 | Huo | G06Q 10/06311 |

OTHER PUBLICATIONS

"International Application Serial No. PCT/US2017/049074, Written Opinion dated Dec. 14, 2017", 10 pgs.

* cited by examiner

CLOUD CONTAINER RESOURCE BINDING AND TASKING USING KEYS

BACKGROUND

Cloud server farms may employ a variety of services implementing virtual network functions (VNF), edge services (e.g., load balancing, virtual private networks (VPNs), pre-processing, task scheduling, etc.), and application hosting services. Through different types of services, the computing resources hosting them may often come from the same pool of processors, storage and networking, which are re-tasked according to need. Re-tasking automation is increasingly important to both public and private cloud hosting companies as it represents down time when no revenue can be generated. Improper re-tasking can lead to security problems especially if resources are reused across tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

To mitigate security risks caused by retasking of cloud-based resources, the cloud resources that may be retasked are assigned a task group credential, which may be used to verify that a client performing a task is authorized to perform the task. Further, reusable resources may be bound to cloud-based service containers and the cloud-based service containers may be bound to tasks to help provide a more secure environment for resources reuse and to protect privacy. Cloud-based service containers may offer greater flexibility for cloud operators when assigning resources and when scheduling task executions while helping to ensure security of task execution and data protection.

Figure 1:
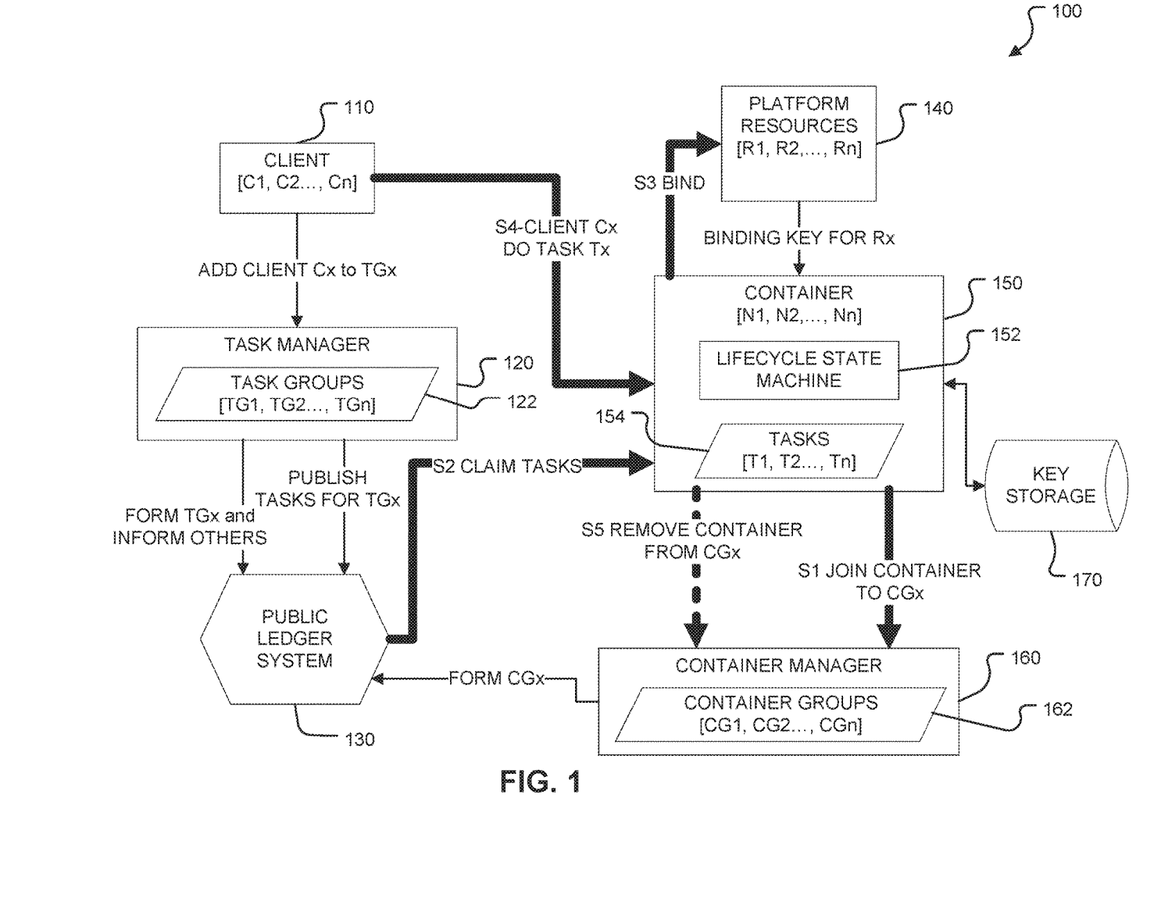
FIG. 1 illustrates a functional block diagram of a cloud container resource binding and tasking system in accordance with some embodiments of the disclosure.

FIG. 1 illustrates a functional block diagram of a cloud container resource binding and tasking system 100 in accordance with some embodiments of the disclosure. The system 100 may include several entities including clients 110, a task manager 120, a public ledger system 130, platform resources 140, a container manager 160, and a key storage database 170. Each of entities (e.g., the clients 110, the task manager 120, the public ledger system 130, the platform resources 140, the container manager 160, and the key storage database 170) may operate on separate hardware from some or all of the other entities, common hardware as some or all of the other entities, or any combination of separate and common hardware as some or all of the other entities.

FIG. 1 may include three primary entities, e.g., the task manager 120, the public ledger system 130, containers 150, and the container manager 160 that may each operate independently of each other. The task manager 120 may manage a set of clients 110 to implement a distributed control application (e.g., process control, lighting, HVAC, workflow process, accounting etc.). The container manager 160 may manage a set of execution resources, server farms, rack systems, discrete platforms, etc. The public ledger system 130 may assist in providing operational integrity without a central point of failure or attack. Examples of the public ledger system 130 may include Bitcoin, Ripple, Ethereum, Stellar, etc. The containers may manage a group of tasks and resources.

The task manager 120 may use enhanced privacy identification (EPID) groups to assign an individual client Cx 110, where x is any of 1 to n, to a particular distributed application. The client Cx 110 may be a separate device, such as a phone, a controller for an HVAC system, etc., or it may be virtual client, such as an application running on a server or a separate computing device. A set of tasks (e.g., a task group TGx 122) may determine which distributed application is intended. When the client Cx 110 wishes to perform a task in a control application, for example, the client Cx 110 may provide a request to be added to a task group TGx 122, where x is any of 1 to n. The task manager 120 may perform an EPID join protocol with the client Cx 110 to assign the client Cx 110 to the task group TGx 122. The EPID join protocol may authorize participation in the distributed application by the client Cx 110. The task manager 120 may form the task group TGx 122 and provide information about the formation of task group TGx 122 to the public ledger system 130. The task manager 120 may also publish the set of tasks associated with the task group TGx 122 to the public ledger system 130. Publishing the task group TGx 122 and associated tasks to the public ledger system 130 may provide transparency and help ensure that there are no hidden tasks having security implications. A large community that accesses the public ledger system 130 may vet the behaviors of the task group TGx 122. At this point, the client Cx 110 may be ready to perform a task.

However, before a task can be performed, a container may be allocated and bound to a resource. The container manager 160 may manage a pool of containers 150 in container groups 162. A container Nx 150, where x is any of 1 to n, may include executable, initialization code and a set of tasks that are loaded into a resource Rx of the platform resources 140, where x is any of 1 to n. The platform resources 140 may include physical resources, such Internet of things (IoT) resources, sensors, fans, motors, actuators, etc., in some examples. The platform resources 140 may also include virtual resources, such as virtual resources used for simulations, in some examples. The resource Rx's role may be limited to perform a set of functions defined by the container Nx's 150 state in the lifecycle state machine 152.

A first step S1 may include the container manager 160 joining the container NX 150 to a container group CGx 162, where x is any of 1 to n, as defined by an EPID group key. The container group CGx 162 key may identify a tenant (e.g., guest) of a cloud service provider. The EPID group key may be use to authenticate container to container interactions that are within a domain of the tenant, even if from different container groups, in some examples. The container manager 160 may define container groups CG1-CGn in a business model context that includes specifying tasks, resources, and operational considerations, some examples.

The second step S2 may include the container Nx 150 claiming tasks of task group TGx 122 that belong to a distributed control application associated with the TGx 122 to form the claimed tasks 154. In this context, claiming of the tasks for the container Nx 150 may be in terms of an object model (e.g., as defined by open mobile alliance (OMA) lightweight machine to machine (LWM2M), open connectivity foundation (OCF), Alljoyn, object management group (OMG), etc.), such that the tasks are made discoverable by the clients 110. The public ledger system 130 may record the claim event by signing a transaction involving the task group TGx's 122 task list. The entry in the public ledger system 130 entry may show that a container of group CGx 162 claimed the tasks of the task group TGx 122, but may not to reveal container instance of the container group CGx 162 claimed the tasks. In some examples, a second container instance of the container group CGx 162 may copy a task into its container directly (e.g., without posting a second transaction to the public ledger system 130).

In a third step S3, the container Nx 150 may bind to a resource Rx of the platform resources 140 to perform associated tasks 154 of the container Nx 150. The container Nx 150 may use the tasks 154 to identify suitable resources from the platform resources 140 to bind. The container 150 may also unbind from one resource of the platform resources 140 and bind to another resource of the platform resources 140. In an example of unbinding a first resource R1 from the container Nx and binding a second resource R2 to the container Nx 150, the container Nx 150 may cause the first resource R1 to perform a key exchange with the second resource R2 to negotiate a new storage key that is to be used to migrate the container Nx's 150 private keys to the second resource. The key exchange protocol may be protected using the respective trusted execution environments (TEE). An example key exchange protocol include an RSA key-encryption-key or public key cryptography standards #12 (PKCS#12) password based key encryption key. The keys may be stored at the key storage database 170.

In step S4, the client Cx 110 may provide a request to perform a task Tx. Responsive to opening a connection to the container Nx 150, the client Cx 110 may request an attestation using the container group CGx 162 private key to sign the task Tx 154 it implements and to describe any runtime settable resource capabilities, such as a response time guarantee or service level agreement. The client Cx 110 may verify the task group TGx 122 is authorized to the container group CGx 162, and then may submit the task Tx 154. The task request may be signed using the task group TGx 122 key. The container Nx 150 may verify that the client Cx 110 is a member of the task group TGx 122 and that the task Tx 154 is a member of the task list for the task group TGx 122. The verification signatures may optionally be published to the public ledger system 130 for public inspection and detection of impropriety. In an example, the specific container and or the specific client Cx 110 may not be trackable by their posts to the public ledger system 130.

In optional step S5, the container manager 160 may remove a container Nx 150 from the container group CGx. This may be achieved using a trusted delete capability implemented by the TEE of the resource Rx of the platform resources 140. An attestation of the deletion of the container from CGx's 162 private key instance may include the TEE manufacturer's attestation certificate. The container manager 160 may verify the TEE assertion and keep a log of how many group members of the CGx 162 are outstanding. The container manager 160 may use group membership statistics to manage group size and privacy relevance.

Figure 2:
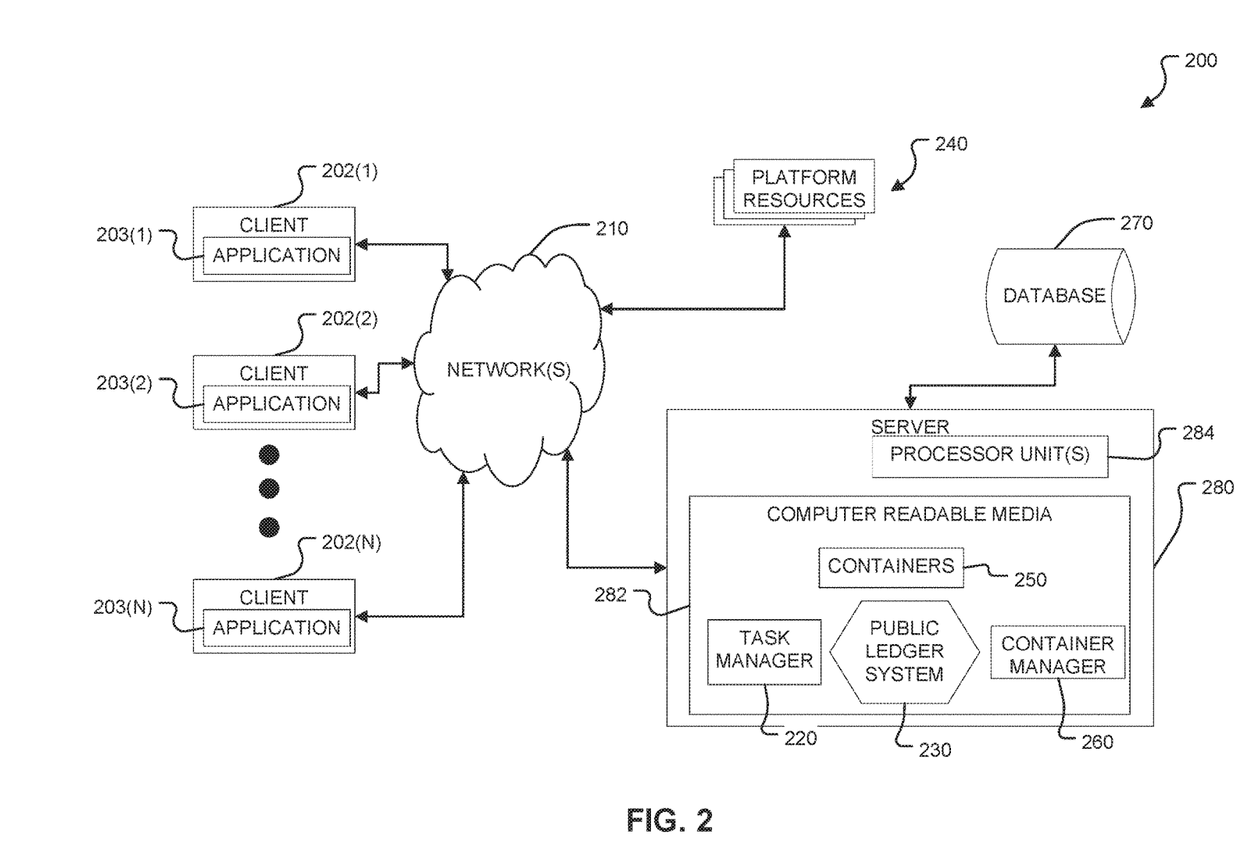
FIG. 2 illustrates a block diagram of an exemplary configuration of a cloud container resource binding and tasking system in accordance with some embodiments of the disclosure.

FIG. 2 illustrates a block diagram of an exemplary configuration of a cloud container resource binding and tasking system 200 in accordance with some embodiments of the disclosure. The system 200 include one or more of the server 280 to bind a client of the clients 202(1-N) to tasks, tasks to containers 250, and the containers 250 to platform resources 240. The platform resources 240 may include physical resources, such IoT resources, sensors, fans, motors, actuators, etc., in some examples. The platform resources 240 may also include virtual resources, such as virtual resources used for simulations, in some examples. Each of the clients 202(1-N) may include a computer readable medium (or multiple computer readable media) encoded with executable instructions, such as an application 203(1-N), that may be executable by one or more processing units (not shown in FIG. 2) to request addition to a task group and to request tasks to be performed using the platform resources 240. In some examples, each of the clients 202(1-N) may include interfaces, circuits, and/or modules to communicate with the server 280 to request addition to a task group or to perform tasks associated with the task group using the platform resources 240.

Each of the clients 202(1-N) may be coupled to a network 210 to task group addition requests or to provide requests to the server 280 to perform tasks using the platform resources 240. The task group may be tied to a client using EPID group keys.

The network 210 may be implemented using one or more networks, such as, but not limited to, local area networks (LANs), wide area networks (WANs), metropolitan area networks (MANs), cellular networks, and/or the Internet. Communications provided to, from, and within the network 210 may be wired and/or wireless, and further may be provided by any networking devices known in the art, now or in the future. Devices communicating over the network 210 may communicate with any communication protocol, including, but not limited to, TCP/IP, UDP, RS-232, and IEEE 802.11, Long-Term Evolution (LTE) or LTE advanced wireless communication, or any other cellular/wireless communication standard.

The server 280 may provide, process, and/or communicate with interfaces, modules and/or circuits to manage containers, public exchange ledgers, and tasks. The server 280 may include one or more processing units 284 and computer readable media 282. The computer readable media 282 may encode instructions for a task manager 220, a public ledger system 230, the containers 250, a container manager 260, or combinations thereof. The task manager 220 may implement the task manager 120 of FIG. 1. The public ledger system 230 may implement the public ledger system 130 of FIG. 1. The containers 250 may implement the containers 150 of FIG. 1. The container manager 260 may implement the container manager 160 of FIG. 1. For example, the task manager 220 may receive a request from one or more of the clients 202(1-N) to be added to a task group. Responsive to the request, the task manager 220 may add the requesting client to the task group and may form the task group and provide information associated with the task group to the public ledger system 230. The task manager 220 may use EPID group leys to assign the requesting client to the task group associated with a distributed application. For example, the task manager 220 may perform an EPID Join protocol with the requesting client to authorize participation in the distributed application. The task group may include a set of tasks. The set of tasks may determine which distributed application is intended. The task manager 220 may also publish tasks for the task group. Publishing the task group and associated tasks may provide transparency and help ensure that there are no hidden tasks having security implications. At this point, the requesting client may be ready to perform a task.

The container manager 260 may manage a pool of containers. The containers may include an executable, initialization code and a set of tasks that are loaded into a resource of the platform resources 240. The resource's role may be limited to performing a set of functions defined by the container's state in the lifecycle state machine.

A first step may include the container manager 260 joining the container 250 to a container group, as defined by an EPID group key. A second step may include the container 250 claiming tasks that belong to a distributed control application. The claiming of the tasks may be in terms of an object model, such that the tasks are made discoverable by the clients 202(1-N). The public ledger system 230 may record the claim event on by signing a transaction involving the task group's task list. The entry in the public ledger system 230 may show that a container of the container group claimed the tasks of the task group, but may not to reveal container instance of the container group claimed the tasks. In some examples, a second container instance of the container group may copy a task into its container directly (e.g., without posting a second transaction to the public ledger system 230).

A third step may include the container 250 binding to a resource of the platform resources 240 to perform claimed tasks of a task group. The container 250 may identify suitable resources from the platform resources 240 that are capable of performing tasks of the task group. In an example of unbinding a first resource R1 from the container 250 and binding a second resource R2 to the container, the first resource R1 may performs a key exchange with the second resource R2 to negotiate a new storage key used to migrate the container's private keys to the second resource. The key exchange protocol may be protected using the respective trusted execution environments (TEE). An example key exchange protocol include an RSA key-encryption-key or public key cryptography standards #12 (PKCS#12) password based key encryption key. The keys may be stored at the database 270. Once bound, task group containers form a nexus between containers, tasks, and bound resources of the platform resources 240.

A fourth step may include the requesting client performing a particular task. Responsive to opening a connection to the container 250, the client may request an attestation using the container group private key to sign the task it implements and to describe any runtime settable resource capabilities, such as a response time guarantee or service level agreement. The requesting client may verify the task group is authorized to the container group, and then may submit the task. The task request may be signed using the task group key. The container 250 may verify the client is a member of task group and that the particular task is a member of the task list for the task group. Signatures associated with these verifications may optionally be published to the public ledger system 230 for public inspection and detection of impropriety. In an example, the specific container and or the specific client may not be trackable by their posts to the public ledger system 230.

An optional fifth step may include removal of a container from the container group. The container manager 260 may remove the container 250 from the container group using a trusted delete capability implemented in the TEE of platform resources 240. An attestation of the deletion of the container from container group's private key instance may include the TEE manufacturer's attestation certificate. The container manager 260 may verify the TEE assertion and keep a log of how many group members of the container groups are outstanding. The container manager 260 may use group membership statistics to manage group size and privacy relevance.

In summary, the server 280 executing the task manager 220 may use EPID groups to associate a particular client with a particular task group and particular tasks with the particular task group. The server 280 executing the container manager 260 may use EPID groups to associate particular containers with particular container groups. The server 280 executing the containers 250 may claim task groups and may bind to the platform resources 240. The server 280 executing the public ledger system 230 may keep track of keys used for the task groups and container groups to facilitate a secure protocol to access the platform resources 240 for performance of tasks. One advantage of containers is that they allow reallocation to a different resource of the platform resources 240 in a secure way such that a container 250 is unbound from a first resource and bound to a second resource, while the other parts of the chain remain intact. While FIG. 2 depicts the task manager 220, the public ledger system 230, the containers, and the container manager 260 on a single server 280, it is understood that one or more of the task manager 220, the public ledger system 230 and the container manager 260 may reside on different servers and may be connected to the server 280 by the network 210. Further, rather than being separate entities connected by the network 210, one or more of the clients 202(1-N) may be virtual clients that also reside on the server 280.

Figure 3:
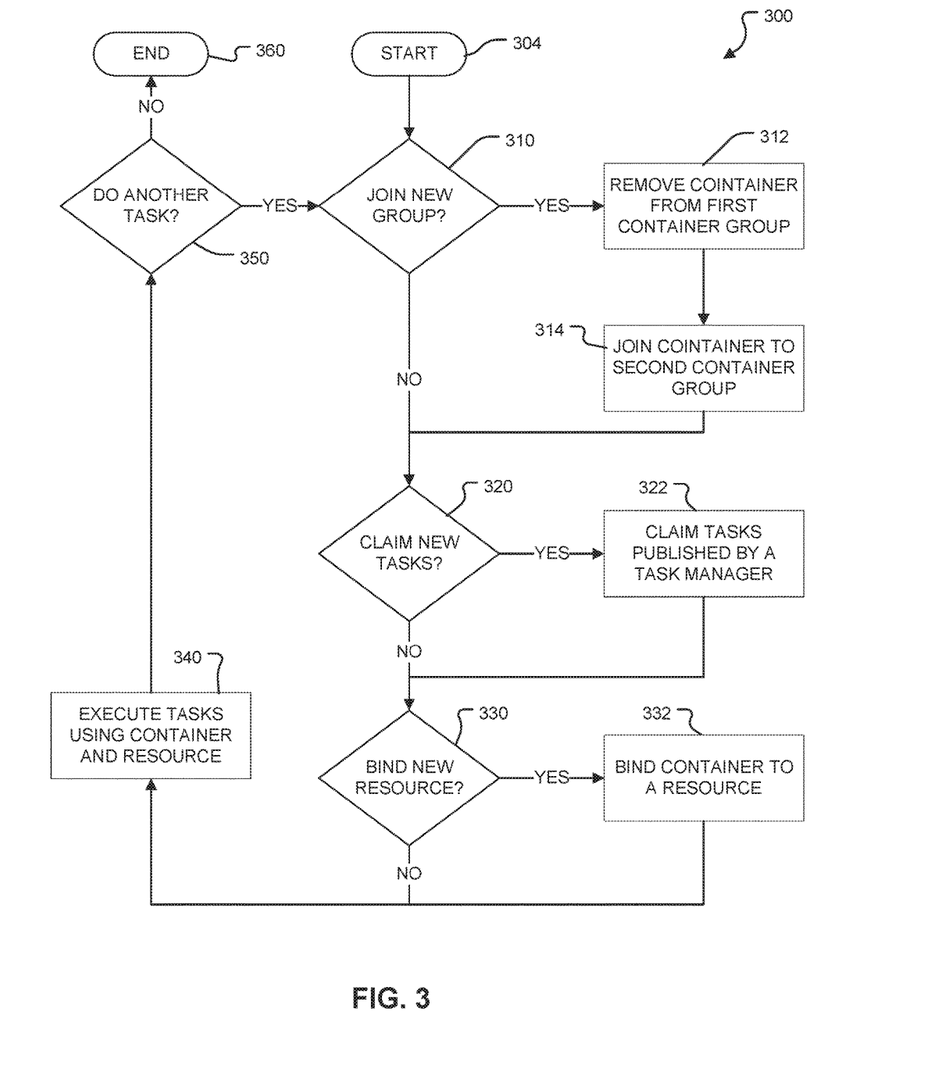
FIG. 3 illustrates a flow diagram of a method to perform cloud-based resource binding and tasking in accordance with some embodiments of the disclosure.

FIG. 3 illustrates a flow diagram of a method 300 to perform cloud-based resource binding and tasking in accordance with some embodiments of the disclosure.

The method 300 may be implemented in the system 100 of FIG. 1, the system 200 of FIG. 2, or combinations thereof.

At the start, 304, the method 300 may include determining whether a container should join a new group, at 310. A container manager, such as the container manager 160 of FIG. 1 or the container manager 260 of FIG. 2, may determine whether the container should join a new group. The container may include any of the containers 150 of FIG. 1 or the containers 250 of FIG. 2. If the container should join a new group, the method 300 may include removing the container from the first container group, at 312, and join the container to a second container group, at 314.

The joining process may be performed using an EPID join protocol to join the new group. The join transaction may be registered in a public ledger system. The container may be joined to the second container group as defined by an EPID group key associated with the second container group.

If the container should remain in an existing group or after the container has joined the second container group, the method 300 may further include determining whether to claim new tasks, at 320. If new tasks are to be claimed by the container, the method 300 may further include claiming new tasks published by a task manager, at 322. The determination as to whether the tasks should be claimed may be based on an intended a distributed control application. The newly claimed tasks may form a task container group. The claiming of the tasks may be in terms of an object model, such that the tasks are made discoverable by clients. The claimed tasks may be recorded in a public ledger system, such as the public ledger system 130 of FIG. 1 or the public ledger system 230 of FIG. 2, by signing a transaction involving the task group's task list. The entry in the public ledger system 230 may show that a container of the container group claimed the tasks of the task group, but may not to reveal container instance of the container group claimed the tasks.

If the container should use existing claimed tasks or after the container has claimed the new tasks, the method 300 may further include determining whether to bind the container to a new resource, at 330. If the container is to be bound to the new resource, the method 300 my further include binding the container to the new resource, at 332. The container may identify suitable resources that are capable of performing tasks of the task group. The method 300 may also include unbinding a container from a previously bound resource prior to binding the container to a new resource. In an example of unbinding a first resource from the container and binding a second resource to the container, the first resource may performs a key exchange with the second resource to negotiate a new storage key used to migrate the container's private keys to the second resource. Once bound, task group containers form a nexus between containers, tasks, and bound resources of the resources.

If the container should remain bound to a previous resource or after the container has been bound to the new resource, the method 300 may further include executing tasks using the container and the resource, at 340. Performance of a task may be initiated by a client, such as one of the clients 110 of FIG. 1 or one of the 202(1-N) of FIG. 2. Responsive to opening a connection to the container, the client may request an attestation using the container group private key to sign the task it implements and to describe any runtime settable resource capabilities, such as a response time guarantee or service level agreement. The requesting client may verify the task group is authorized to the container group, and then may submit the task. The task request may be signed using the task group key. The container may verify the client is a member of task group and that the particular task is a member of the task list for the task group. Signatures associated with these verifications may optionally be published to the public ledger system 230 for public inspection and detection of impropriety. In an example, the specific container and or the specific client may not be trackable by their posts to the public ledger system 230.

The method 300 may further include determining whether more tasks are to be performed, at 350. If more tasks are to be performed, the method 300 may return to step 320. Otherwise, the method may end, at 360.

Figure 4:
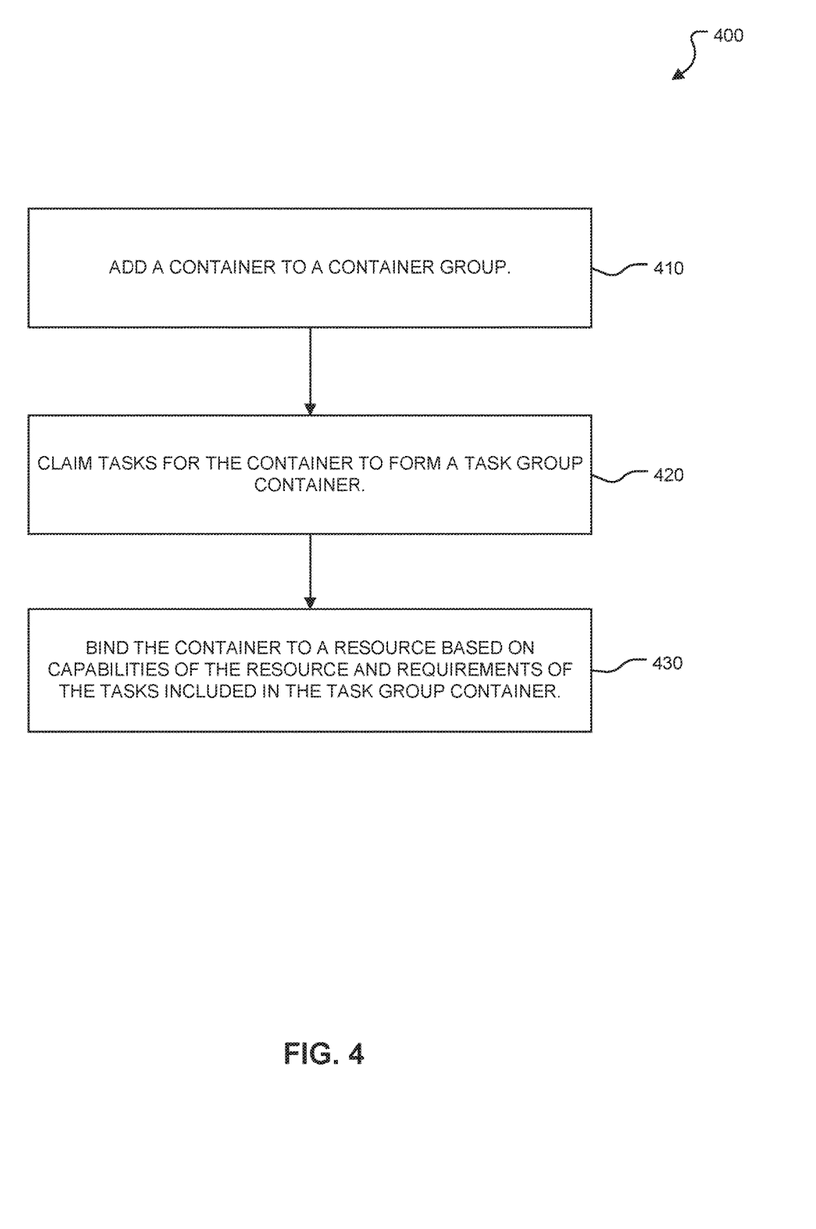
FIG. 4 illustrates a flow diagram of a method to perform cloud-based resource binding and tasking in accordance with some embodiments of the disclosure.

FIG. 4 illustrates a flow diagram of a method 400 to perform cloud-based resource binding and tasking in accordance with some embodiments of the disclosure. The method 400 may be implemented in the container manager 160 of FIG. 1, the container manager 260 of FIG. 2, or combinations thereof.

The method 400 may include adding a container to a container group, at 410. In some examples, the method 400 may further include registering the container group with a public ledger system, such as the public ledger system 130 of FIG. 1 or the public ledger system 230 of FIG. 2. In some examples, adding the container to the container group may include adding the container to the container group using an enhanced privacy identification (EPID) join protocol, wherein the container group has an associated EPID group key. In some examples, claiming tasks for the container to form the task group container includes claiming tasks using an object model such that the tasks are made discoverable by a client.

The method 400 may further include claiming tasks for the container to form a task group container, at 420. In some examples, claiming tasks for the container to form the task group claiming tasks of a task group. A task group may include tasks associated with a distributed application. The method 400 may further include recording an entry in the public ledger system associated with the claim of the tasks by the container. The entry in the public ledger system associated with the claim of the tasks by the container may identify the container group. In some examples, binding the container to a resource based on capabilities of the resource and requirements of the tasks included in the task group container may include unbinding the container from a previously bound resource. In an example, the previously bound resource may be a virtual resource and the resource may be a physical resource.

The method 400 may further include binding the container to a resource based on capabilities of the resource and requirements of the tasks included in the task group container, at 430. The resource may include one of the platform resources 140 of FIG. 1 or one of the platform resources 240 of FIG. 2. In some examples, binding the container to a resource based on capabilities of the resource and requirements of the tasks included in the task group container may include identifying resources capable of performing the tasks in the task group container. In some examples, the method 400 may further include, in response to a request from a client to perform a task included in a task group, verifying that the client is a member of the task group. In some examples, the method 400 may further include, in response to a request from the client to perform the task of the task group, verifying that the task is included in the task group. In some examples, the method 400 may further include publishing signatures associated with verification that the client is a member of the task group and verification that the task is included in the task group may be published in the public ledger system.

Figure 5:
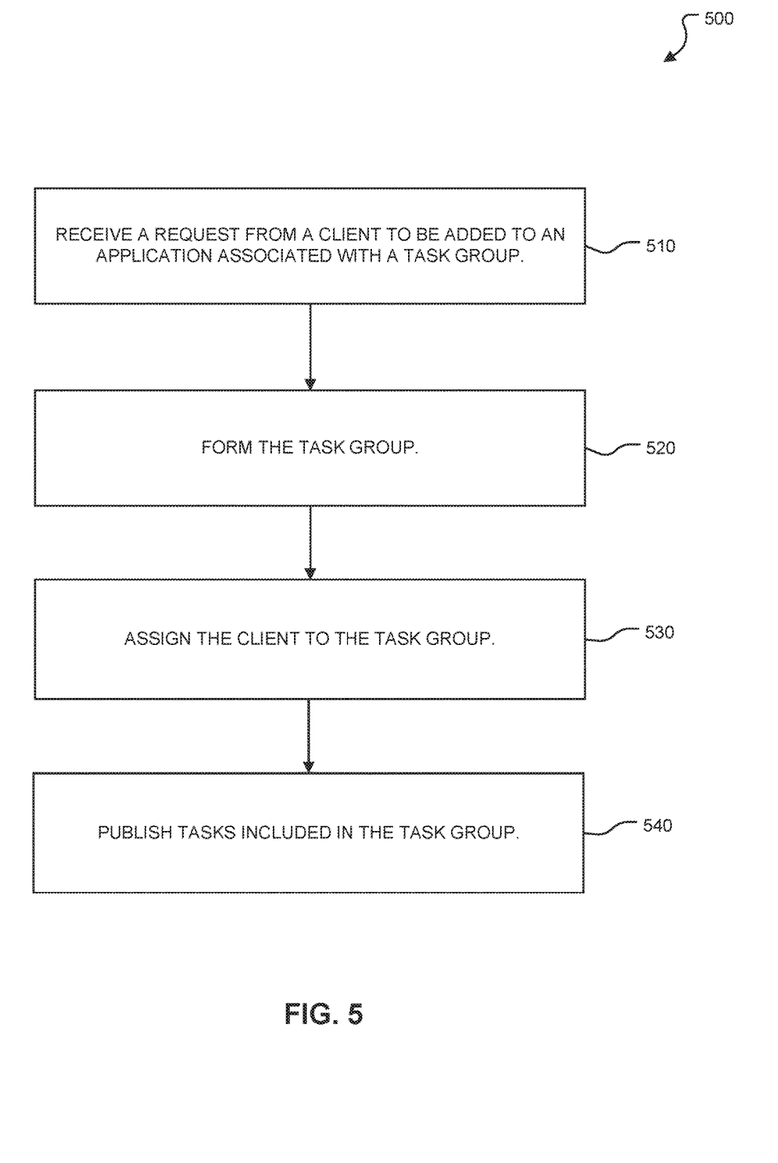
FIG. 5 illustrates a flow diagram of a method to perform cloud-based resource binding and tasking in accordance with some embodiments of the disclosure.

FIG. 5 illustrates a flow diagram of a method 500 to perform cloud-based resource binding and tasking in accordance with some embodiments of the disclosure. The method 500 may be implemented in the task manager 120 of FIG. 1, the task manager 220 of FIG. 2, or combinations thereof.

The method 500 may include receiving a request from a client to be added to an application associated with a task group, at 510. The client may include any one of the clients 110 of FIG. 1 or the clients 202(1-N) of FIG. 2.

The method 500 may include forming the task group, at 520. In some examples, the method 400 may further include registering the container group with a public ledger system, such as the public ledger system 130 of FIG. 1 or the public ledger system 230 of FIG. 2. In some examples, adding the container to the container group may include adding the container to the container group using an enhanced privacy identification (EPID) join protocol, wherein the container group has an associated EPID group key. In some examples, claiming tasks for the container to form the task group container includes claiming tasks using an object model such that the tasks are made discoverable by a client.

The method 500 may further include assigning the client to the task group, at 530. In some examples, adding the client to the task group may include the task manager to assigning the client to the task group using an enhanced privacy identification (EPID) group. In some examples, assigning the client to the task group may include assigning the client to the task group using an EPID join protocol. The method 500 may further include providing information associated with the task group to a public ledger system, including assignment of the client to the task group. The method 500 may further include recording an entry in the public ledger system associated with the claim of the tasks by the container. The entry in the public ledger system associated with the claim of the tasks by the container may identify the container group. In some examples, binding the container to a resource based on capabilities of the resource and requirements of the tasks included in the task group container may include unbinding the container from a previously bound resource. In an example, the previously bound resource may be a virtual resource and the resource may be a physical resource.

The method 500 may further include publishing tasks included in the task group, at 540. In some examples, publishing the tasks included in the task group may include publishing the tasks included in the task group to the public ledger system, such as the public ledger system 130 of FIG. 1 or the public ledger system of FIG. 2.

In some examples, the method 500 may further include adding a container to a container group, claiming tasks from the task group for the container to form a task group container, binding the container to a resource based on capabilities of the resource and requirements of the tasks included in the task group container, and maintaining transactions associated the task group and the container group in a public ledger system.

Figure 6:
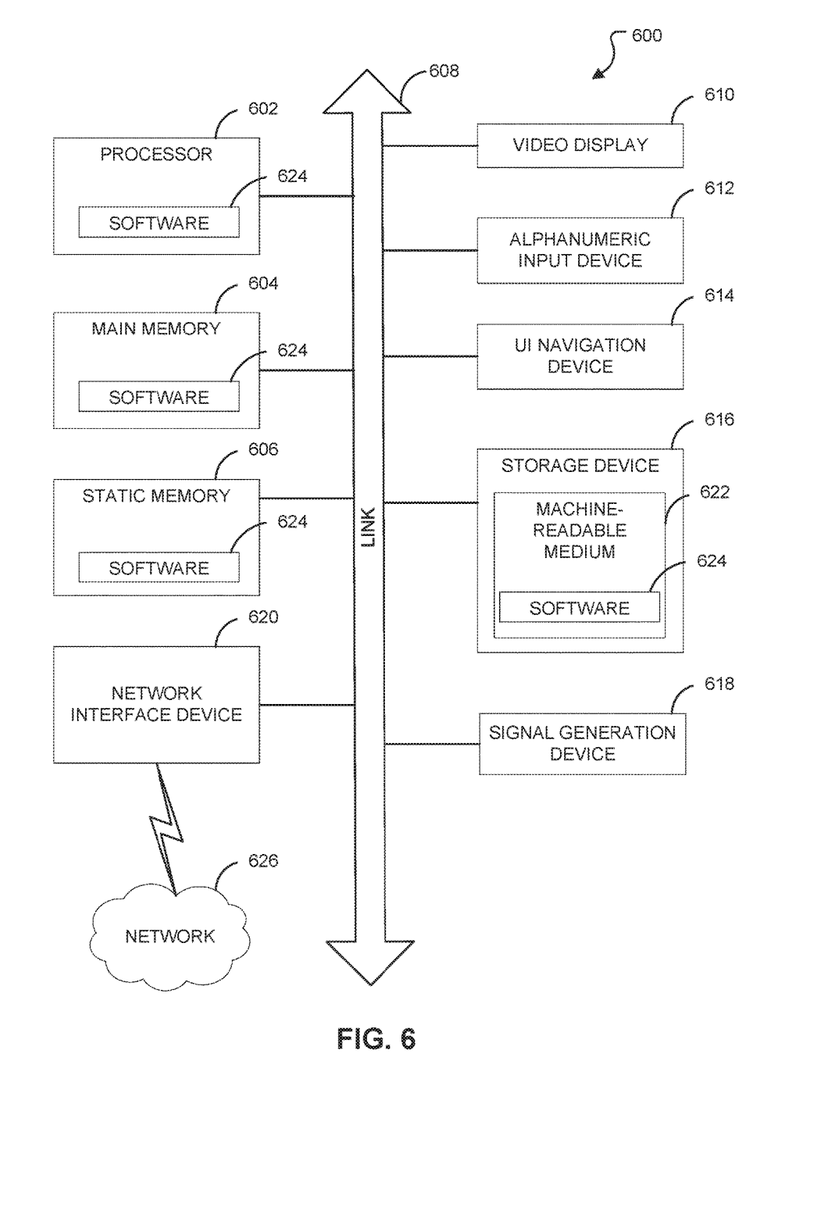
FIG. 6 illustrates a block diagram illustrating a machine in the example form of a computer system in accordance with some embodiments of the disclosure.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor unit 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor unit 602 during execution thereof by the computer system 600, with the main memory 604, static memory 606, and the processor unit 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

Additional Notes & Examples

Example 1 is a device to bind and perform tasks using cloud-based resources, the device comprising: a container to Example tasks to be performed, the container further to select and bind to a resource based on capabilities of the resource and requirements of the tasks.

In Example 2, the subject matter of Example 1 optionally includes wherein the container is registered to a container group via a container manager.

In Example 3, the subject matter of any one or more of Examples 1-2 optionally include wherein the container is registered to the container group via a container manager using an enhanced privacy identification (EPID) join protocol, wherein the container group has an associated EPID group key.

In Example 4, the subject matter of any one or more of Examples 1-3 optionally include wherein the tasks to be performed are included in a task group associated with a distributed application.

In Example 5, the subject matter of Example 4 optionally includes wherein to Example tasks to be performed includes the container to claim tasks using an object model such that the tasks are made discoverable by a client.

In Example 6, the subject matter of any one or more of Examples 4-5 optionally include wherein to Example tasks to be performed includes the container to record an entry in a public ledger system associated with the claim of the tasks by the container.

In Example 7, the subject matter of Example 6 optionally includes wherein the entry in the public ledger system associated with the Example of the tasks by the container identifies a container group in which the container is included.

In Example 8, the subject matter of any one or more of Examples 1-7 optionally include wherein to select and bind to a resource based on capabilities of the resource and requirements of the tasks includes the container to identify resources capable of performing the tasks.

In Example 9, the subject matter of any one or more of Examples 1-8 optionally include wherein to select and bind to a resource based on capabilities of the resource and requirements of the tasks includes the container to unbind from a previously bound resource.

In Example 10, the subject matter of Example 9 optionally includes wherein the previously bound resource is a virtual resource and the resource is a physical resource.

In Example 11, the subject matter of any one or more of Examples 1-10 optionally include wherein in response to a request from a client to perform a task included in a task group, the container to verify that the client is a member of the task group.

In Example 12, the subject matter of Example 11 optionally includes wherein in response to a request from the client to perform the task of the task group, the container to verify that the task is included in the task group.

In Example 13, the subject matter of Example 12 optionally includes wherein the container further to publish signatures associated with verification that the client is a member of the task group and verification that the task is included in the task group may be published in a public ledger system.

In Example 14, the subject matter of Example 13 optionally includes a container manager to form a container group that includes the container; the public ledger system to maintain transactions associated the task group and the container group; and a task manager to add the client to the task group and to publish the tasks included in the task group.

In Example 15, the subject matter of any one or more of Examples 1-14 optionally include wherein the resource is accessible to the container via a network.

In Example 16, the subject matter of Example 15 optionally includes wherein the resource is a virtual resource.

In Example 17, the subject matter of any one or more of Examples 15-16 optionally include wherein the resource is a physical resource.

Example 18 is a device to bind and perform tasks using cloud-based resources, the device comprising: a task manager receive a request from a client to be added to an application associated with a task group, the task manager form the task group and to assign the client to the task group, the task manager further to publish tasks included in the task group.

In Example 19, the subject matter of Example 18 optionally includes wherein to assign the client to the task group includes the task manager to use an enhanced privacy identification (EPID) group to assign the client to the task group.

In Example 20, the subject matter of Example 19 optionally includes wherein to assign the client to the task group includes the task manager to use an EPID join protocol to assign the client to the task group.

In Example 21, the subject matter of any one or more of Examples 18-20 optionally include wherein the task manager further to provide information associated with the task group to a public ledger system, including assignment of the client to the task group.

In Example 22, the subject matter of any one or more of Examples 18-21 optionally include wherein to publish tasks included in the task group includes the task manager to publish the tasks included in the task group to the public ledger system.

In Example 23, the subject matter of any one or more of Examples 18-22 optionally include a container to Example tasks from the task group and to bind to a resource based on capabilities of the resource and requirements of the claimed tasks; a container manager to add the container to a container group; and a public ledger system to maintain transactions associated the task group and the container group.

Example 24 is a method to bind and perform tasks using cloud-based resources, the method comprising: claiming, by a container, tasks to be performed; and binding to a resource based on capabilities of the resource and requirements of the claimed tasks.

In Example 25, the subject matter of Example 24 optionally includes wherein the container is included in the container group that is registered in a public ledger system.

In Example 26, the subject matter of Example 25 optionally includes adding the container to a container group using an enhanced privacy identification (EPID) join protocol, wherein the container group has an associated EPID group key.

In Example 27, the subject matter of any one or more of Examples 24-26 optionally include wherein claiming, by the container, the tasks to be performed includes claiming tasks of a task group, wherein a task group is associated with a distributed application.

In Example 28, the subject matter of Example 27 optionally includes wherein claiming, by the container, the tasks to be performed includes claiming tasks using an object model such that the tasks are made discoverable by a client.

In Example 29, the subject matter of any one or more of Examples 27-28 optionally include recording an entry in a public ledger system associated with the Example of the tasks by the container.

In Example 30, the subject matter of Example 29 optionally includes wherein the entry in the public ledger system associated with the Example of the tasks by the container identifies the container group.

In Example 31, the subject matter of any one or more of Examples 24-30 optionally include wherein binding to the resource based on capabilities of the resource and requirements of the claimed tasks includes identifying resources capable of performing the tasks in the task group container.

In Example 32, the subject matter of any one or more of Examples 24-31 optionally include wherein binding to the resource based on capabilities of the resource and requirements of the claimed tasks includes unbinding from a previously bound resource.

In Example 33, the subject matter of Example 32 optionally includes wherein the previously bound resource is a virtual resource and the resource is a physical resource.

In Example 34, the subject matter of any one or more of Examples 24-33 optionally include in response to a request from a client to perform a task included in a task group, verifying that the client is a member of the task group.

In Example 35, the subject matter of Example 34 optionally includes in response to a request from the client to perform the task of the task group, verifying that the task is included in the task group.

In Example 36, the subject matter of Example 35 optionally includes publishing signatures associated with verification that the client is a member of the task group and verification that the task is included in the task group may be published in a public ledger system.

In Example 37, the subject matter of any one or more of Examples 24-36 optionally include wherein the resource is a virtual resource.

In Example 38, the subject matter of any one or more of Examples 24-37 optionally include wherein the resource is a physical resource.

Example 39 is at least one medium including instructions that, when executed on a machine cause the machine to perform any of the methods of Examples 24-38.

Example 40 is an apparatus comprising means for performing any of the methods of Examples 24-38.

Example 41 is a method to bind and perform tasks using cloud-based resources, the method comprising: receiving a request from a client to be added to an application associated with a task group; forming the task group; assigning the client to the task group; and publishing tasks included in the task group.

In Example 42, the subject matter of Example 41 optionally includes wherein assigning the client to the task group includes assigning the client to the task group using an enhanced privacy identification (EPID) group.

In Example 43, the subject matter of Example 42 optionally includes wherein assigning the client to the task group includes assigning the client to the task group using an EPID join protocol.

In Example 44, the subject matter of any one or more of Examples 41-43 optionally include providing information associated with the task group to a public ledger system, including assignment of the client to the task group.

In Example 45, the subject matter of any one or more of Examples 41-44 optionally include wherein publishing the tasks included in the task group includes publishing the tasks included in the task group to the public ledger system.

In Example 46, the subject matter of any one or more of Examples 41-45 optionally include adding a container to a container group; claiming tasks from the task group; binding the container to a resource based on capabilities of the resource and requirements of the tasks included in the task group container; and maintaining transactions associated the task group and the container group in a public ledger system.

Example 47 is at least one medium including instructions that, when executed on a machine cause the machine to perform any of the methods of Examples 41-46.

Example 48 is an apparatus comprising means for performing any of the methods of Examples 41-46.

Example 49 is an apparatus to bind and perform tasks using cloud-based resources, the apparatus comprising: means for claiming, by a container, tasks to be performed;

and means for binding to a resource based on capabilities of the resource and requirements of the claimed tasks.

In Example 50, the subject matter of Example 49 optionally includes wherein the container is included in a container group that is registered in a public ledger system.

In Example 51, the subject matter of Example 50 optionally includes means for adding the container to a container group using an enhanced privacy identification (EPID) join protocol, wherein the container group has an associated EPID group key.

In Example 52, the subject matter of any one or more of Examples 49-51 optionally include wherein means for claiming, by the container, the tasks to be performed includes means for claiming tasks of a task group, wherein a task group is associated with a distributed application.

In Example 53, the subject matter of Example 52 optionally includes wherein means for claiming, by the container, the tasks to be performed includes means for claiming tasks using an object model such that the tasks are made discoverable by a client.

In Example 54, the subject matter of any one or more of Examples 52-53 optionally include means for recording an entry in a public ledger system associated with the Example of the tasks by the container.

In Example 55, the subject matter of Example 54 optionally includes wherein the entry in the public ledger system associated with the Example of the tasks by the container identifies the container group.

In Example 56, the subject matter of any one or more of Examples 49-55 optionally include wherein means for binding to the resource based on capabilities of the resource and requirements of the claimed tasks includes means for identifying resources capable of performing the tasks in the task group container.

In Example 57, the subject matter of any one or more of Examples 49-56 optionally include wherein means for binding to the resource based on capabilities of the resource and requirements of the claimed tasks includes means for unbinding from a previously bound resource.

In Example 58, the subject matter of Example 57 optionally includes wherein the previously bound resource is a virtual resource and the resource is a physical resource.

In Example 59, the subject matter of any one or more of Examples 49-58 optionally include in response to a request from a client to perform a task included in a task group, means for verifying that the client is a member of the task group.

In Example 60, the subject matter of Example 59 optionally includes in response to a request from the client to perform the task of the task group, means for verifying that the task is included in the task group.

In Example 61, the subject matter of Example 60 optionally includes means for publishing signatures associated with verification that the client is a member of the task group and verification that the task is included in the task group may be published in a public ledger system.

In Example 62, the subject matter of any one or more of Examples 49-61 optionally include wherein the resource is a virtual resource.

In Example 63, the subject matter of any one or more of Examples 49-62 optionally include wherein the resource is a physical resource.

Example 64 is an apparatus to bind and perform tasks using cloud-based resources, the apparatus comprising: means for receiving a request from a client to be added to an application associated with a task group; means for forming the task group; means for assigning the client to the task group; and means for publishing tasks included in the task group.

In Example 65, the subject matter of Example 64 optionally includes wherein means for assigning the client to the task group includes means for assigning the client to the task group using an enhanced privacy identification (EPID) group.

In Example 66, the subject matter of Example 65 optionally includes wherein means for assigning the client to the task group includes means for assigning the client to the task group using an EPID join protocol.

In Example 67, the subject matter of any one or more of Examples 64-66 optionally include means for providing information associated with the task group to a public ledger system, including assignment of the client to the task group.

In Example 68, the subject matter of any one or more of Examples 64-67 optionally include wherein means for publishing the tasks included in the task group includes means for publishing the tasks included in the task group to the public ledger system.

In Example 69, the subject matter of any one or more of Examples 64-68 optionally include means for adding a container to a container group; means for claiming tasks from the task group; binding the container to a resource based on capabilities of the resource and requirements of the tasks included in the task group container; and maintaining transactions associated the task group and the container group in a public ledger system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device to bind and perform tasks using cloud-based resources, the device comprising:
   a task manager to:
   add a client to a task group; and
   publish tasks included in the task group;
   a public ledger access system to access a public ledger that maintains transactions associated with the task group and a container group;
   a container to claim the tasks to be performed, the container further to:
   select a resource based on capabilities of the resource and requirements of the tasks in the task group;
   bind to the resource;
   in response to a request from a client to perform a task included in the task group, verify that the client is a member of the task group, and verify that the task is included in the task group; and
   publish signatures associated with verification that the client is a member of the task group and verification that the task is included in the task group in the public ledger; and
   a container manager to form the container group that includes the container.

2. The device of claim 1, wherein the tasks to be performed are included in the task group associated with a distributed application.

3. The device of claim 2, wherein to claim tasks to be performed includes the container to claim tasks using an object model such that the tasks are made discoverable by the client.

4. The device of claim 2, wherein to claim tasks to be performed includes the container to record an entry in the public ledger associated with the claim of the tasks by the container.

5. The device of claim 1, wherein to select the resource based on capabilities of the resource and requirements of the tasks includes the container to unbind from a previously bound resource.

6. The device of claim 5, wherein the previously bound resource is a virtual resource and the resource is a physical resource.

7. A device to bind and perform tasks using cloud-based resources, the device comprising:
   a task manager to:
   receive a request from a client to be added to an application associated with a task group;
   form the task group;
   assign the client to the task group; and
   publish tasks included in the task group;
   a public ledger access system to access a public ledger that maintains transactions associated with the task group and a container group;
   a container to:
   claim the tasks to be performed;
   select a resource based on capabilities of the resource and requirements of the tasks in the task group;
   bind to the resource;
   in response to a request from a client to perform a task included in the task group, verify that the client is a member of the task group and verify that the task is included in the task group;
   publish signatures associated with verification that the client is a member of the task group and verification that the task is included in the task group in a public ledger; and
   execute the task, wherein the resource is used to execute the task; and
   a container manager to form the container group that includes the container.

8. The device of claim 7, wherein to assign the client to the task group includes the task manager to use an enhanced privacy identification (EPID) group to assign the client to the task group.

9. The device of claim 8, wherein to assign the client to the task group includes the task manager to use an EPID join protocol to assign the client to the task group.

10. The device of claim 7, wherein the task manager further to provide information associated with the task group to the public ledger system, including assignment of the client to the task group.

11. At least one non-transitory machine-readable medium including instructions to bind and perform tasks using cloud-based resources, which when executed by a machine, cause the machine to:
    add a client to a task group;
    publish tasks included in the task group;
    select a resource based on capabilities of the resource and requirements of the tasks in the task group;
    claim tasks to be performed, wherein the tasks are included in the task group;
    bind to the resource;
    in response to a request from a client to perform a task included in the task group, verify that the client is a member of the task group and verify that the task is included in the task group;
    publish signatures associated with verification that the client is a member of the task group and verification that the task is included in the task group in a public ledger, wherein the public ledger maintains transactions associated with the task group and a container group;
    form the container group that includes the container; and
    execute the task, wherein the resource is used to execute the task.

12. The at least one machine-readable medium of claim 11, further including instructions, which when executed by a machine, cause the machine to add the container to the container group using an enhanced privacy identification (EPID) join protocol, wherein the container group has an associated EPID group key.

13. The at least one non-transitory machine-readable medium of claim 11, wherein to claim the tasks to be performed includes instructions, which when executed by a machine, cause the machine to claim tasks of the task group, wherein a task group is associated with a distributed application.

14. The at least one non-transitory machine-readable medium of claim 13, wherein claiming, by the container, the tasks to be performed includes instructions, which when executed by a machine, cause the machine to claim tasks using an object model such that the tasks are made discoverable by a client.

15. The at least one non-transitory machine-readable medium of claim 13, further including instructions, which when executed by a machine, cause the machine to record an entry in the public ledger.

16. The at least one non-transitory machine-readable medium of claim 15, wherein the entry in the public ledger identifies the container group.

17. A method to bind and perform tasks using cloud-based resources, the method comprising:
    receiving a request from a client to be added to an application associated with a task group;
    forming the task group;
    assigning the client to the task group;
    publishing tasks included in the task group;
    claiming tasks from the task group;
    selecting a resource based on capabilities of the resource and requirements of the tasks in the task group;
    binding to the resource;
    verifying, in response to a request from a client to perform a task included in the task group, that the client is a member of the task group;
    verifying that the task is included in the task group;
    publishing signatures associated with verification that the client is a member of the task group and verification that the task is included in the task group in a public ledger, wherein the public ledger maintains transactions associated with the task group and a container group; and
    forming the container group that includes the container.

18. The method of claim 17, wherein assigning the client to the task group includes assigning the client to the task group using an enhanced privacy identification (EPID) group.

19. The method of claim 17, wherein publishing the tasks included in the task group includes publishing the tasks included in the task group to the public ledger system.

20. The method of claim 17, wherein claiming the tasks from the task group comprises claiming the tasks using an object model such that the tasks are made discoverable by the client.

* * * * *

UNITED STATES PATENT AND TRADEMARK OFFICE
CERTIFICATE OF CORRECTION

PATENT NO. : 10,241,842 B2
APPLICATION NO. : 15/280990
DATED : March 26, 2019
INVENTOR(S) : Smith et al.

Page 1 of 1

It is certified that error appears in the above-identified patent and that said Letters Patent is hereby corrected as shown below:

In the Claims

In Column 18, Line 14, in Claim 7, delete "perforin" and insert --perform-- therefor In Column 18, Line 62, in Claim 12, after "one", insert --non-transitory--

Signed and Sealed this
Twenty-first Day of April, 2020

Andrei Iancu
*Director of the United States Patent and Trademark Office*